(12) United States Patent
Ward

(10) Patent No.: US 10,076,677 B2
(45) Date of Patent: Sep. 18, 2018

(54) FIRE MIST APPARATUS AND SYSTEM AND METHOD OF USE THEREOF

(71) Applicant: Sleep Safe Systems Ltd., Newbury (GB)

(72) Inventor: Robert Ward, Newbury (GB)

(73) Assignee: Sleep Safe Systems, Ltd., Newbury (GB)

(*) Notice: Subject to any disclaimer, the term of this patent is extended or adjusted under 35 U.S.C. 154(b) by 94 days.

(21) Appl. No.: 14/567,264

(22) Filed: Dec. 11, 2014

(65) Prior Publication Data

US 2016/0158586 A1 Jun. 9, 2016

(30) Foreign Application Priority Data

Dec. 4, 2014 (GB) .................................. 1421557.8

(51) Int. Cl.
| | |
|---|---|
| *A62C 3/00* | (2006.01) |
| *F21V 33/00* | (2006.01) |
| *F21S 9/02* | (2006.01) |
| *F21V 17/00* | (2006.01) |
| *F21V 23/06* | (2006.01) |
| *A62C 35/00* | (2006.01) |

(Continued)

(52) U.S. Cl.
CPC ................ *A62C 3/00* (2013.01); *A62C 35/00* (2013.01); *F21S 9/022* (2013.01); *F21V 7/00* (2013.01); *F21V 17/002* (2013.01); *F21V 17/005* (2013.01); *F21V 23/003* (2013.01); *F21V 23/06* (2013.01); *F21V 33/0064* (2013.01); *F21V 33/0076* (2013.01); *F21S 8/026* (2013.01); *F21Y 2113/13* (2016.08); *F21Y 2115/10* (2016.08)

(58) Field of Classification Search
CPC ...... F21S 8/00; F21S 9/022; F21S 7/00; F21S 17/002; F21W 2121/02; A62C 3/00; A62C 35/00
USPC ......................................... 169/56; 239/18–20
See application file for complete search history.

(56) References Cited

U.S. PATENT DOCUMENTS 3,834,463 A * 9/1974 Allard .................... A62C 37/10
 169/28
4,564,889 A * 1/1986 Bolson ...................... F21S 8/00
 290/54

(Continued)

FOREIGN PATENT DOCUMENTS

| | | |
|---|---|---|
| DE | 299 06 760 U1 | 9/1999 |
| EP | 2 316 536 A2 | 5/2011 |

(Continued)

OTHER PUBLICATIONS

Thomas J. Fellers and Michael W. Davidson—National High Magnetic Field Laboratory, The Florida State University, Tallahassee, Florida, 32310. Molecular Expressions Optical Microscopy Primer—Physics of Light and Color, Nov. 13, 2015 , Florida State University's online programs, https://micro.magnet.fsu.edu/primer/lightandcolor/reflectionintro.htm.*

(Continued)

*Primary Examiner* — Chee-Chong Lee
(74) *Attorney, Agent, or Firm* — Woodard, Emhardt, Moriarty, McNett & Henry LLP

(57) ABSTRACT

Fire mist apparatus and method are provided including a fire mist dispensing head having at least one fluid outlet provided for dispensing a fluid on activation of the same in use. The apparatus further includes illumination capable of emitting light in use.

16 Claims, 6 Drawing Sheets

(51) Int. Cl.
*F21V 7/00* (2006.01)
*F21V 23/00* (2015.01)
*F21S 8/02* (2006.01)
*F21Y 115/10* (2016.01)
*F21Y 113/13* (2016.01)

(56) References Cited

U.S. PATENT DOCUMENTS

| | | | | |
|---|---|---|---|---|
| 4,616,298 A | * | 10/1986 | Bolson | A62C 37/08 |
| | | | | 290/54 |
| 4,851,819 A | | 7/1989 | Kawai et al. | |
| 4,937,562 A | | 6/1990 | Kaminaka et al. | |
| 6,021,960 A | * | 2/2000 | Kehat | B05B 15/00 |
| | | | | 239/18 |
| 6,439,472 B1 | * | 8/2002 | Lin | B05B 15/00 |
| | | | | 239/16 |
| 6,637,676 B2 | * | 10/2003 | Zieger | B05B 1/18 |
| | | | | 239/18 |
| 7,616,126 B2 | | 11/2009 | Kadwell et al. | |
| 2006/0007009 A1 | * | 1/2006 | Hess | G08B 17/113 |
| | | | | 340/628 |
| 2010/0071915 A1 | | 3/2010 | Caldani | |
| 2011/0012359 A1 | | 1/2011 | Liao et al. | |
| 2013/0147397 A1 | * | 6/2013 | McBryde | H02J 9/02 |
| | | | | 315/312 |

FOREIGN PATENT DOCUMENTS

| | | |
|---|---|---|
| EP | 2 371 424 A1 | 10/2011 |
| KR | 2011 0080275 A | 7/2011 |
| WO | WO 2010/078559 A1 | 7/2010 |

OTHER PUBLICATIONS

Dorling Kindersley, Reflection, Jun. 2015, Fact Monster, http://www.factmonster.com/dk/science/encyclopedia/reflection.html.*
PCT International Search Report—dated Mar. 3, 2015—PCT/GB2014/053671.

* cited by examiner

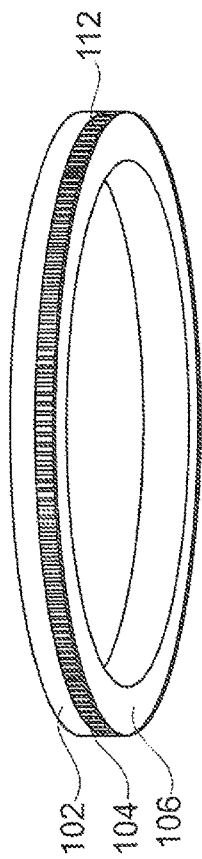
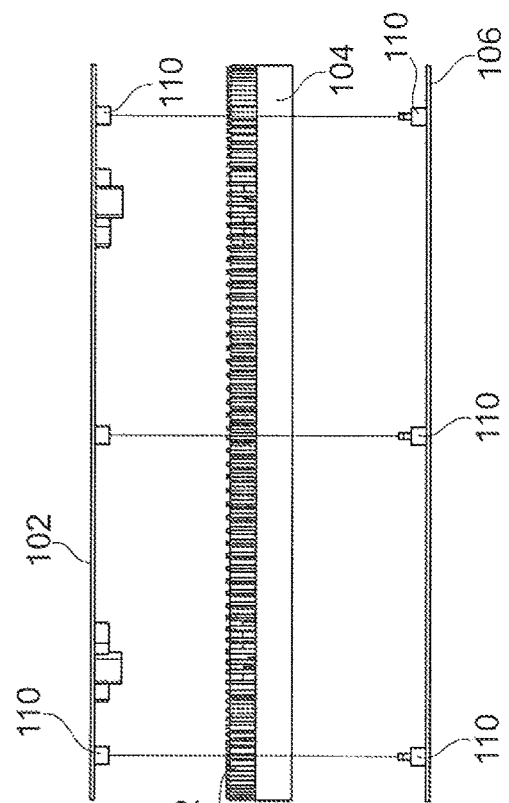
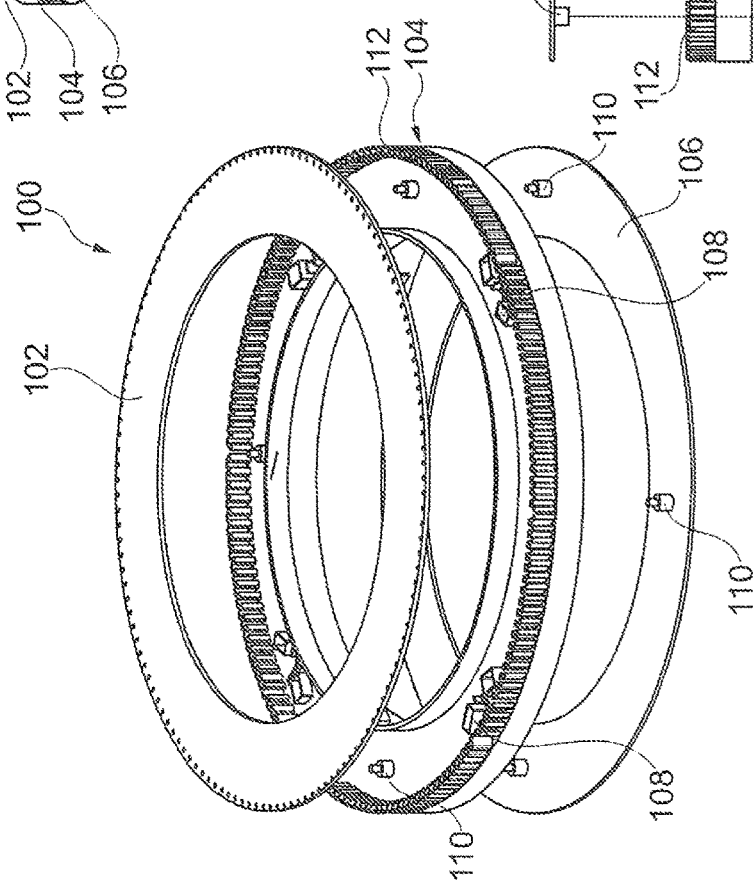

FIRE MIST APPARATUS AND SYSTEM AND METHOD OF USE THEREOF

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Field of the Invention

This invention relates to fire mist apparatus, to a system incorporating fire mist apparatus and to a method of using fire mist apparatus and a fire mist system.

Description of Related Art Including Information Disclosed Under 37 CFR 1.97 and 1.98

It is known to provide fire sprinkler systems in commercial buildings and homes as an active form of fire protection. Conventional fire sprinkler systems typically comprise a plurality of sprinkler heads distributed around a building which are connected to a water supply. If any of the sprinkler heads within the system detect sufficient heat, the bulb within the sprinkler head is activated and water from the water supply is released through the sprinkler head to help suppress and contain any fire that may be associated with the source of detected heat. In buildings completely protected by fire sprinkler systems, over 99% of fires can be controlled by fire sprinklers alone.

There are a number of different types of fire sprinkler systems available and the type used typically depends on the location in which the fire sprinkler system is to be installed. For example, a water spray or deluge system is where all the sprinklers within the water piping system are opened once sufficient heat in one of the sprinklers is detected. This system is typically used where rapid fire spread is a concern as they provide simultaneous application of water over the entire potential hazard area. An alternative system is a water mist system where a heat absorbent vapour is created that provides a larger total surface area of water exposed to a possible fire. This type of system is usually used where water damage may be of concern or where water supplies are limited.

It is known to provide illumination means associated with fire sprinkler systems. For example, US2005141216 and U.S. Pat. No. 5,263,290 disclose service units that can incorporate lighting, fire alarm detectors, water fire sprinklers and/or air conditioning ducts therewith. US2011012359 discloses a swirly water spray sprinkler that has a lighting module for providing illumination when the water spray is discharged. US2010071915 and EP2280224 also describe water spray sprinklers that have lighting associated with the same. These systems are limited to water deluge or water spray systems and also have limited illumination options associated with the same.

It is therefore an aim of the present invention to provide improvements for fire mist apparatus.

It is a further aim of the present invention to provide improvements to a system incorporating fire mist apparatus.

It is a yet further aim of the present invention to provide improvements to a method of using fire mist apparatus and/or a system incorporating fire mist apparatus.

BRIEF SUMMARY OF THE INVENTION

According to a first aspect of the present invention there is provided fire mist apparatus, said apparatus including a fire mist dispensing head having at least one fluid outlet means provided thereon for dispensing a fluid therefrom on activation of the same in use and wherein said apparatus further includes illumination means capable of emitting light therefrom in use.

Thus, the present invention has made the advance of providing illumination means or device on or associated with a fire mist dispensing head, in contrast to the prior art which only shows illumination means being provided with a fire water deluge or water spray dispensing head.

The illumination means or device incorporated in the fire mist apparatus is typically rated at IP65, thereby providing limited ingress of water and zero ingress of dust into the apparatus.

The illumination means can be arranged to provide lighting at any specified time, such as for example, all the time, whenever it is in an "on" condition, whenever the apparatus is moved from a non-activated condition to an activated condition, it can provide the main or sole source of illumination in the locality in which the apparatus is located and/or it can be used to provide emergency lighting in the locality in which the apparatus is fitted in use.

The term emergency lighting is typically lighting that is provided for an emergency situation when a main power supply is cut and normal illumination systems might fail. Emergency lighting is normally required to operate fully automatically and provide illumination of a sufficiently high level to enable all occupants to evacuate the premises/locality safely.

The illumination means can include any means which can provide illumination and/or emit light therefrom when in an "on" or "activated" condition. Preferably the illumination means are in the form of one or more Light Emitting Diodes (LEDs).

Preferably a plurality of LEDs and/or illumination means are provided on or associated with the apparatus.

Preferably the illumination means are integral with, provided within the same unit or housing or associated with the same apparatus as the fire mist dispensing head.

The LEDs and/or illumination means can generate light of the same colour and/or different colours at the same time and/or at different times. For example, white light LEDs could be provided, green light LEDs, blue light LEDs and/or the like. The different colour LEDs and/or illumination means can provide mood lighting in the locality if required.

In one embodiment a user may be able to select and/or control using a control means or device any or any combination of the colour of light being emitted from the illumination means and/or LEDs at any particular time, at two or more different times, an illumination sequence of the illumination means, a time period or point of illumination of the illumination means, how many of the illumination means are illuminated, the brightness of the illumination means and/or the like.

In one embodiment DMX control means or device (digital multiplex—a standard for digital communication networks used to control lighting) is provided with or associated with the illumination means and/or LEDs to allow automated and/or user control of the illumination means.

The illumination means of the present invention can provide the main or sole lighting for the locality in which the apparatus is located and/or the illumination means can provide emergency lighting for the locality in which the apparatus is located. The emergency lighting could be used to help a person escape and/or safely exit the locality in which the apparatus is provided during an emergency situation.

Preferably power supply means or a power supply are provided in, connected to and/or associated with the apparatus to power the illumination means and/or LEDs in use. The power supply means could also be used to power one or more other electrical components provided with, connected to or associated with the apparatus if required.

In one embodiment the illumination means are illuminated in a first colour, first combination of colours and/or first sequence of illumination when being supplied with power from a first power supply means or in a first power supply condition, and the illumination means are illuminated in at least a second colour, second combination of colours and/or second sequence of illumination when being supplied with power from a second power supply means or in a second power supply condition, the first power supply means or condition being different to the at least second power supply means or condition.

For example, white LEDs or white light could be emitted light from the apparatus when the apparatus is being powered by a mains power supply. Green LEDS or any given colour LEDs or light could be emitted from the apparatus when the apparatus is being powered by a battery back up power supply in the event of failure of the mains power supply. The LEDs and/or illumination means being powered could be the same LEDs and/or illumination means in both the first and second power supply conditions, or different LEDs and/or illumination means could be powered in the first and second power supply conditions. If different LEDs are powered in the first and second power supply conditions, the different LEDs are typically provided on the same apparatus.

Preferably if the second power supply means or condition is moved back to the first power supply means or condition, the illumination means, colour of illumination, combination of colours and/or sequence of illumination is moved from the second condition back to the first condition.

For example, if a mains power supply is reinstated after being cut off, the illumination means and/or LEDs could return from a second illumination condition, such as an emergency lighting condition, to a first illumination condition, such as a main lighting condition.

Preferably reflector means or a reflector is provided on or associated with the illumination means and/or apparatus to reflect light emitted from the illumination means and/or LEDs in use. The reflector means are typically arranged in a housing of the apparatus and a front surface of the reflector can face outwardly towards a front end of the housing.

In one embodiment the reflector means are located at or adjacent a base or end of the first mist dispensing head, behind or towards the rear of the dispensing head. Fluid is typically dispensed from a front of the first mist dispensing head when activated.

In one embodiment the reflector means are substantially U-shaped in form. However, the reflector means can be in any suitable size, shape and/or form to allow light emitted from the illumination means to be reflected away from the dispensing head and/or illumination means in use.

Preferably the reflector means are provided at or towards a front section of a housing of the apparatus.

In one embodiment one or more apertures are defined in the reflector means and the illumination means and/or LEDs are arranged with respect to the apertures in such a manner that light being emitted therefrom is emitted through the apertures. In one example at least part of the illumination means and/or LEDs project through the apertures and outwardly of the reflector means. In one example the illumination means are located at or adjacent the apertures at a rear side of the reflector means.

In one embodiment the illumination means and/or LEDs are provided on or associated with a printed circuit board (PCB). Preferably the printed circuit board is provided behind or adjacent a rear surface of the reflector means.

In one embodiment the dispensing head is arranged to at least partially protrude through an aperture in said reflector means. Thus, in one example, at least part of the dispensing head protrudes outwardly from a front surface of the reflector means.

Preferably the dispensing head is arranged substantially centrally of the reflector means.

In one embodiment electrical transforming means or an electrical transformer is provided on or associated with the apparatus to allow the voltage used to power the illumination means and/or LEDs to be stepped up and/or stepped down as required.

Preferably the electrical transforming means are low voltage transforming means and allow the voltage being supplied to the apparatus to be stepped down. For example, the low voltage transforming means can step the voltage down from 110V or 240V to 12V or 24V. The provision of the low voltage transforming means increases the safety of the apparatus when water and/or water mist is associated with the head and/or being dispensed via the head.

In one embodiment power supply means are provided on or associated with the apparatus. The power supply means can be any or any combination of a mains power supply, electrical generator power supply means, water generator power supply means battery powered supply means, rechargeable batter supply means and/or the like. Thus the apparatus can include a connection for the power supply or can include the power supply itself in the apparatus.

Preferably the illumination means and/or LEDs are provided on or associated with a printed circuit board (PCB).

In one embodiment the PCB is connected to the power supply via an electrical cable or lead that is fitted, and preferably permanently or fixedly fitted, to the PCB. At one end of the electrical cable a male inline connector or connection means can be provided that mates with a female inline connector or connection means that is connectable to the electrical cable connected to the power supply means.

In one embodiment a secondary male connector block or connection means is mountable to the PCB to allow further lighting, LED or illumination means PCBs to be connection to the system. Connection of the further lighting is typically via a pre-assembled electrical cable system.

In one embodiment the battery power supply means is in the form of an emergency backup battery power supply and is activated when detection of another power supply, such as for example a mains power supply, has failed. Thus, in the event of a fire, if the mains power supply is switched off and/or damaged, the illumination means can still receive power from the battery power supply means, thereby maintaining illumination if required.

In one example, when power is being supplied by the battery power supply, this activates a change in condition of the LEDs or illumination means, such as for example, changing the degree or brightness of light being emitted, changing the colour and/or colour combination/sequence of the light being emitted and/or the like.

In one embodiment the illumination means can be moved between different illumination conditions or from an "off" or non-activated condition and an "on" or activated condition automatically on activation of the dispensing head, on activation of a temperature activated bulb, via a switch mechanism, via control means, on activation of motion detection means or device, via activation of smoke detection means or device and/or the like.

The different illumination conditions can be a first illumination condition and at least a second illumination condition. The different illumination conditions can include different colours of lighting, different numbers of lights being activated, different lighting sequences, different brightness of lights and/or the like.

In one embodiment dimming means or a dimmer module is provided on or associated with the apparatus, illumination means and/or switch means operating the illumination means to allow the degree or brightness of illumination provided by the illumination means and/or LEDs to be adjusted in use.

Preferably the apparatus comprises a housing and the dispensing head and the illumination means are provided within the housing (the same single unit housing in one example).

Preferably support means or members are provided in the housing to support one or more of the components therein, such as for example to support the illumination means, PCB, reflector means, dispensing head and/or the like. In one example, the support means includes one or more post members, frame members and/or the like.

In one embodiment attachment means or mechanism is provided on or associated with the dispensing head to allow the dispensing head to be attached to or in a surface in use, either directly or indirectly, such as for example for attachment to the reflector means of the apparatus.

In one embodiment the attachment means or mechanism can include any or any combination of one or more nuts and bolts, screws, welding, adhesive, screw thread fitting, inter-engaging members, bayonet fixing, friction fit, retaining ring, resilient biasing means and/or the like.

Preferably the apparatus is arranged to be ceiling mounted. However, the apparatus could be mounted on any suitable surface as required. The suitable surface can be substantially horizontal, substantially vertical, or at any suitable angle.

In one embodiment engagement means or mechanism is provided on or associated with the apparatus housing to allow the housing to engage in or with a suitable surface in use. The engagement means or mechanism can include any or any combination of one or more nuts and bolts, screws, welding, adhesive, screw thread fitting, inter-engaging members, bayonet fixing, friction fit, spring or sprung legs, retaining ring, resilient biasing means and/or the like.

Preferably the fluid being dispensed from the mist dispensing head is water. However, other fluid, such as for example foam and/or the like could be provided if required.

Preferably the fluid being dispensed is in the form of a fluid vapour or mist. The mist typically includes a plurality of tiny droplets that provide a large surface area and are typically heat absorbent.

In one embodiment the mist dispensing head is connected or connectable to a fluid supply means in use, such as for example a mains water supply, fluid supply connection means and/or the like.

Preferably securing means or mechanism is provided to allow the mist dispensing head to be secured to a fluid or water supply means in use. The securing means or mechanism can include any or any combination of one or more nuts and bolts, screws, welding, adhesive, screw thread fitting, inter-engaging members, bayonet fixing, friction fit, retaining ring, resilient biasing means and/or the like.

The dispensing head can be moved between a non-activated position, wherein fluid mist is prevented from being dispensed via the head, and an activated position, wherein fluid mist can be dispensed from the head. The dispensing head can be moved from the non-activated position to an activated position manually and/or automatically following activation by detection means.

Preferably valve means or mechanism are provided on or associated with the fluid outlet means of the dispensing head so as to allow the outlet means to be moved between a non-activated and an activated position.

Preferably detection means or mechanism are provided to allow the dispensing head, valve means and/or fluid outlet means to be moved between the non-activated position and the activated position on detection of one or more pre-determined conditions. For example, the one or more pre-determined conditions could be any or any combination of the detection of sufficient or pre-determined heat/temperature, detection of sufficient or pre-determined amount of smoke, following activation of a manually activated alarm, on activation of a remotely activated alarm and/or the like.

In one embodiment smoke detection means are provided on, in or are associated with the apparatus for detecting smoke in the locality of the apparatus. Detection of a pre-determined threshold of smoke can activate an alarm, activate an audible warning, such as for example one or more sounds or spoken words, activate the illumination means, actuate the dispensing head, valve means and/or fluid outlet means and/or the like.

The smoke detection means in one embodiment is fitted to or associated with an exterior surface of the apparatus housing or exterior surface of the dispensing head. In an alternative embodiment, and according to a separate aspect of the present invention, the smoke detection means can be fitted with the illumination means without the mist apparatus being present. In this latter example, the smoke detection means could be located substantially centrally of the housing.

The power supply to the smoke detection means can be the same as that providing power supply to the illumination means and/or can be a separate or independent power supply. For example, the smoke detection means could be powered, in whole or part, via one or more batteries provided in or associated with the apparatus.

Preferably the control means and/or power means for the smoke detection means are provided on or associated with a printed circuit board (PCB).

In one embodiment the smoke detection means could be located remotely from the mist apparatus. Communication means could be provided to allow the smoke detection means and mist apparatus to communicate with each other, such as via one or more radio frequency signals, infra-red signals, wiring and/or the like.

In one embodiment the smoke detection means has one or more LEDs or illumination means fitted to or associated with the same which can be illuminated in use to indicate when the detection means has been activated.

In one embodiment the detection means includes a bulb associated with the valve means with a fluid inside the same. The bulb fluid expands as the temperature in the locality increases, thereby increasing the fluid pressure within the bulb. The bulb is arranged to break at a pre-determined temperature, thereby allowing the valve means to be moved from a closed or non-actuated position to an open or actuated position. In the open or actuated position, fluid mist can be dispensed via the dispensing head.

Preferably the fluid outlet means of the dispensing head are arranged so as to dispense a fluid mist therefrom when activated.

Thus, in one embodiment of the present invention the fire mist apparatus incorporates or consists of at least one fire mist dispensing head, illumination means and smoke detection means. The illumination means can be arranged to provide either or both of the emergency lighting and the main lighting for the locality in which the apparatus is located. Thus, a single unit can fulfil all functions required in a locality, thereby reducing costs, saving on fitting time, reducing the amount of electrical wiring required, reducing the number of devices that need to be provided in the locality and/or the like.

According to a second aspect of the present invention there is provided a fire mist system including fire mist apparatus, said apparatus including at least one fire mist dispensing head and wherein illumination means are provided on or associated with said fire mist dispensing head.

Preferably the system includes two or more fire mist dispensing heads.

Preferably each or two or more dispensing heads have illumination means provided on or associated with the same.

Preferably each fire mist dispensing head can be actuated independently and/or in combination and/or simultaneously. Thus, in one example, if any fire mist dispensing head fails, one or more other fire mist dispensing heads will operate as normal and/or continue to operate.

The fire mist apparatus of the present invention can be used in a new fire protection system or retrofitted into an existing fire protection system.

In one embodiment a fire mist dispensing head of the present invention has two or more power supply means. For example, the two or more power supply means could be a mains power supply means and a battery power supply means and/or the like.

According to further independent aspects of the present invention there is provided a method of using fire mist dispensing apparatus; and a method of using a fire mist system.

According to a yet further independent aspect of the present invention there is provided smoke detection apparatus, said apparatus including smoke detection means and illumination means capable of emitting lighting therefrom in use. The smoke detection apparatus can include any or any combination of the features mentioned hereinbefore.

The fire mist dispensing apparatus and system of the present invention is safe and reliable in operation. It provides illumination in any suitable area within a building or locality. The illumination can be primary illumination, secondary illumination and/or emergency illumination as required. The apparatus and system uses readily available components. The illumination can be controlled by a user as to whether it is on or off, the colour of illumination and/or the brightness or degree of illumination.

Thus the present invention provides a fire safety and suppression system that incorporates an illumination or LED lighting unit, and optionally fire detection means.

It will be appreciated that one or more of the abovementioned features could be incorporated into a fire sprinkler apparatus including one or more dispensing heads having at least one fluid outlet means provided for dispensing fluid therefrom.

BRIEF DESCRIPTION OF THE SEVERAL VIEWS OF THE DRAWINGS

Embodiments of the present invention will now be described with reference to the following figures, wherein:

FIGS. 5a-5d show an exploded perspective view, an exploded side view, an assembled perspective view and a plan view from above of smoke detection means that can be incorporated into water mist dispensing apparatus and/or used independently of water mist dispensing apparatus respectively.

DETAILED DESCRIPTION OF THE INVENTION

Figure 1A:
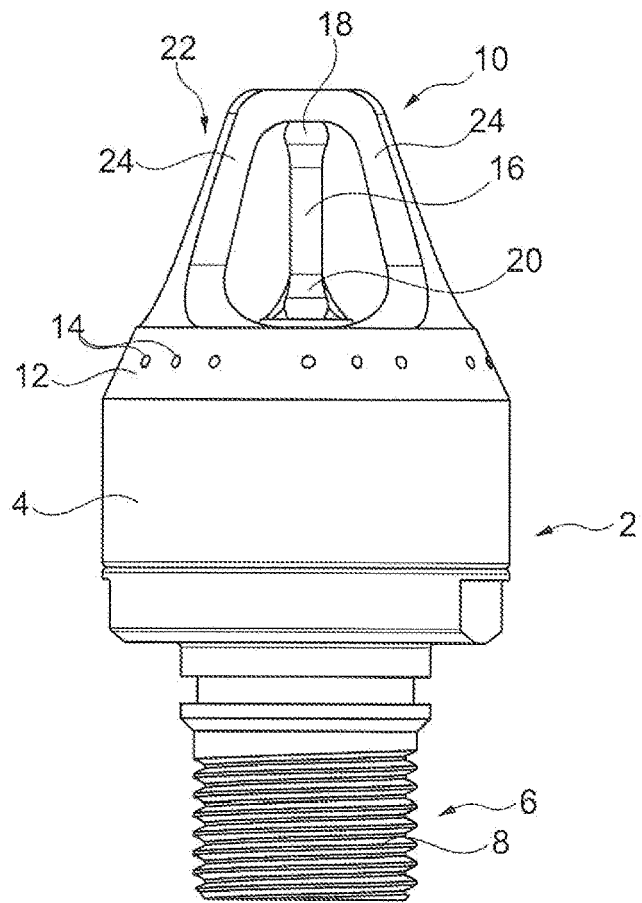
FIGS. 1a-1c show a side view, a perspective view and an end view of a water mist dispensing head according to an embodiment of the present invention respectively.
Figure 1B:
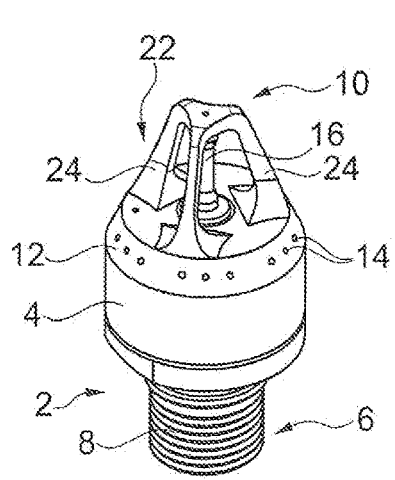
Figure 1C:
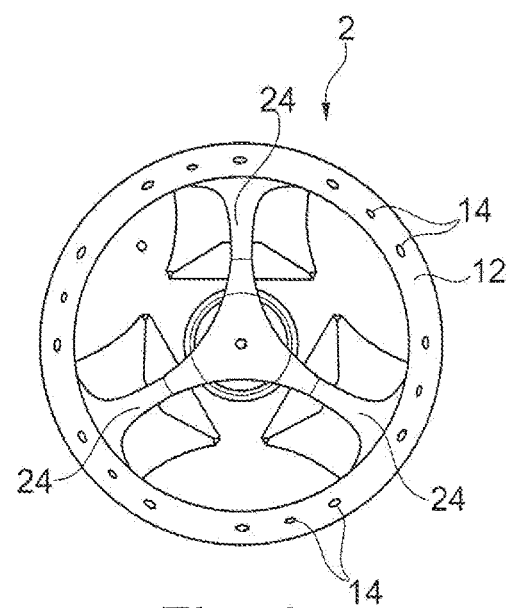
Figure 2:
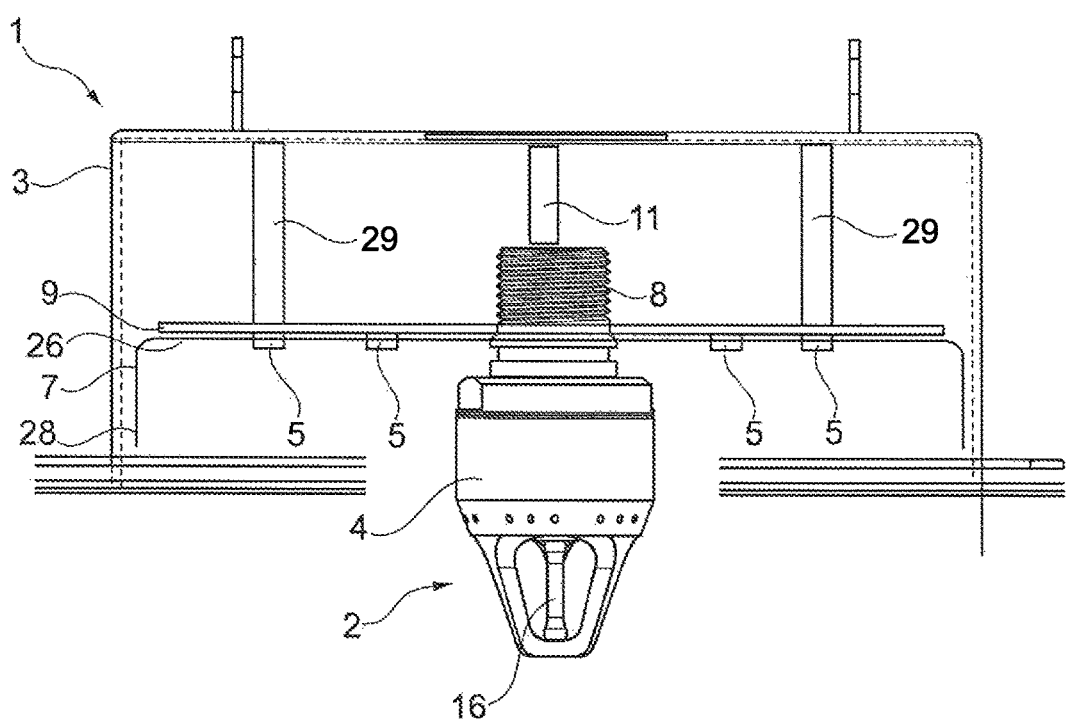
FIG. 2 shows a side view of water mist dispensing apparatus according to an embodiment of the present invention.

Referring to the figures, there is illustrated a fire water mist dispensing apparatus 1 adapted for mounting in a ceiling of a room in use. The apparatus comprises a housing 3 containing a water mist dispensing head 2, illumination means in the form of a plurality of LEDs 5, a reflector 7 and a printed circuit board 9 in contact with the LEDs 5.

The dispensing head 2 includes a body portion 4 having a first end 6 provided with attachment means in the form of a screw threaded connector 8. The screw threaded connector 8 allows the head 2 to engage with complementary engagement means on a water supply pipe 11. An aperture is defined in housing 3 for passage of the water supply pipe 11 therethrough.

The body portion 4 has a tapered neck portion 12 towards a second end 10. A plurality of water outlet apertures 14 are defined around the neck portion 12 and arranged to produce a water mist therefrom when a valve (not shown) provided internally of the body portion and associated with the water supply pipe 11 is moved from a non-actuated position to an actuated position. The provision of the fine mist water particles provides a greater surface area of water available to absorb heat in the locality and to put out a fire, thereby allowing a fire to be put out approximately 10 times faster than water deluge fire protection systems.

Temperature detection means in the form of a bulb 16 is arranged at end 10 and supported between two support ends 18, 20 of a frame 22. A fluid is contained in bulb 16 which expands as the ambient temperature increases, thereby increasing the fluid pressure within the bulb. Once a pre-determined ambient temperature has been reached, such as for example a temperature that may be associated with a fire in the locality, the increase in fluid pressure causes the bulb to break, thereby allowing the valve contained within the body portion 4 to move from the non-actuated position to the actuated position. In the illustration, frame 22 includes three angled support members 24.

In the illustrated example, the reflector 7 is substantially U-shaped having a base 26 and outwardly protruding side walls 28 that extend towards a front of the apparatus. An aperture is defined substantially centrally of the reflector 7 for the location of the dispensing head 2 therethrough. The dispensing head is typically attached to the reflector using attachment means in the form of a retaining ring (not shown). A plurality of apertures are defined in the reflector 7 surrounding the dispensing head to allow the plurality of LEDs 5 to at least partially protrude therethrough.

The LEDs are provided on PCB 9 which is arranged adjacent a rear side of base 26 of reflector 7.

A plurality of support posts 29 are provided in housing 3 at the rear of PCB 9 and reflector 7 to support the PCB 9 and reflector 7 in position within the housing.

The housing 3 is retained within a ceiling surface using engagement means in the form of resilient biasing arms (not shown).

Figure 3:
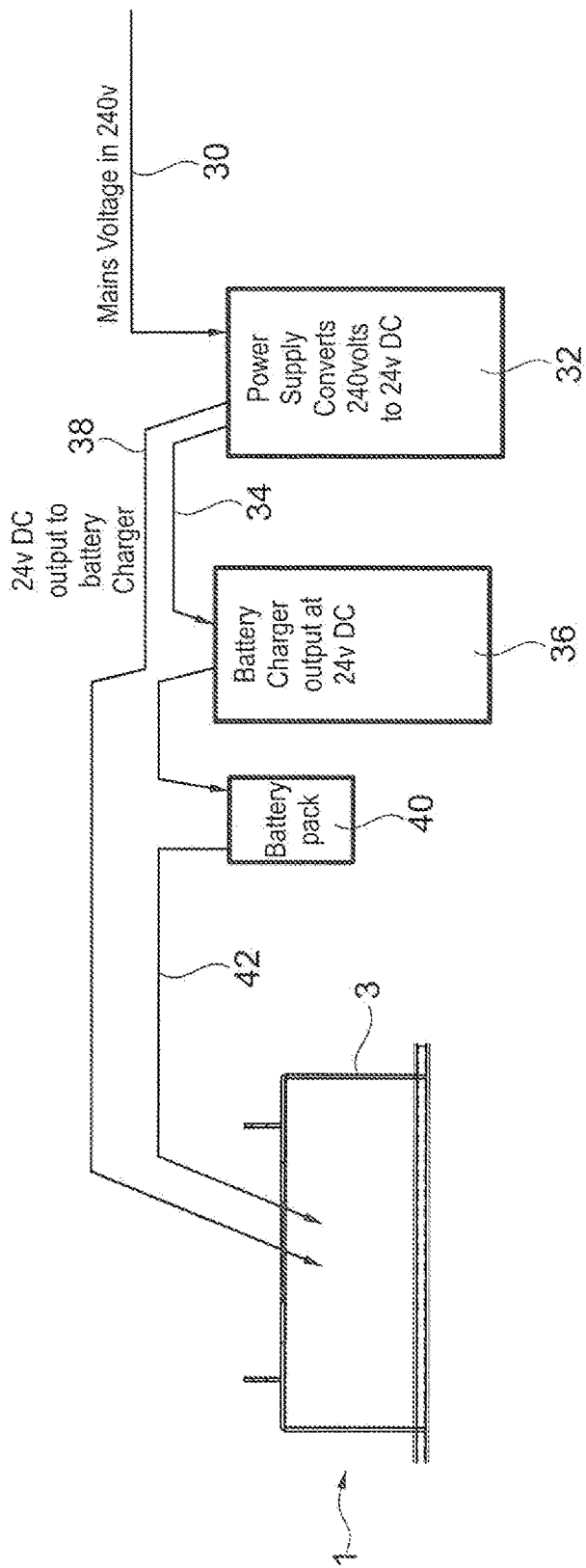
FIG. 3 shows a schematic view of water mist dispensing apparatus according to an embodiment of the present invention.

The apparatus 1 is typically powered by a 240V mains power supply, shown by reference 30 in FIG. 3. Transforming means are associated with the apparatus 1 to step down the incoming voltage from 240V to 24V DC. This 24V DC supply is then split into two feeds; a first feed 34 sent to a battery charger 36 which trickle charges a battery pack 40, and a second feed 38 sent directly to light housing 3 to power the LEDs 5. Switching control means in the form of a dimming switch (not shown) are typically associated with the light housing so a user can adjust the voltage being supplied to the LEDs, thereby allowing a user to select a required level of brightness for the LEDs. In the event the mains power supply 30 fails, as may happen in the event of a fire, the battery pack 40, which is also connected to the LEDs 5 in the light housing 3 via voltage path 42, takes over powering the LEDs from the mains power supply. The light generated by the LEDs is typically moved from a white light to a green light in this condition to inform a user that the lighting is now being run from a battery pack. The battery pack can typically provide illumination of the LEDs for up to 15 hours, or until such time as the mains power supply is restored. On restoration of mains power, the LEDs typically return to emitting white light.

Figure 4:
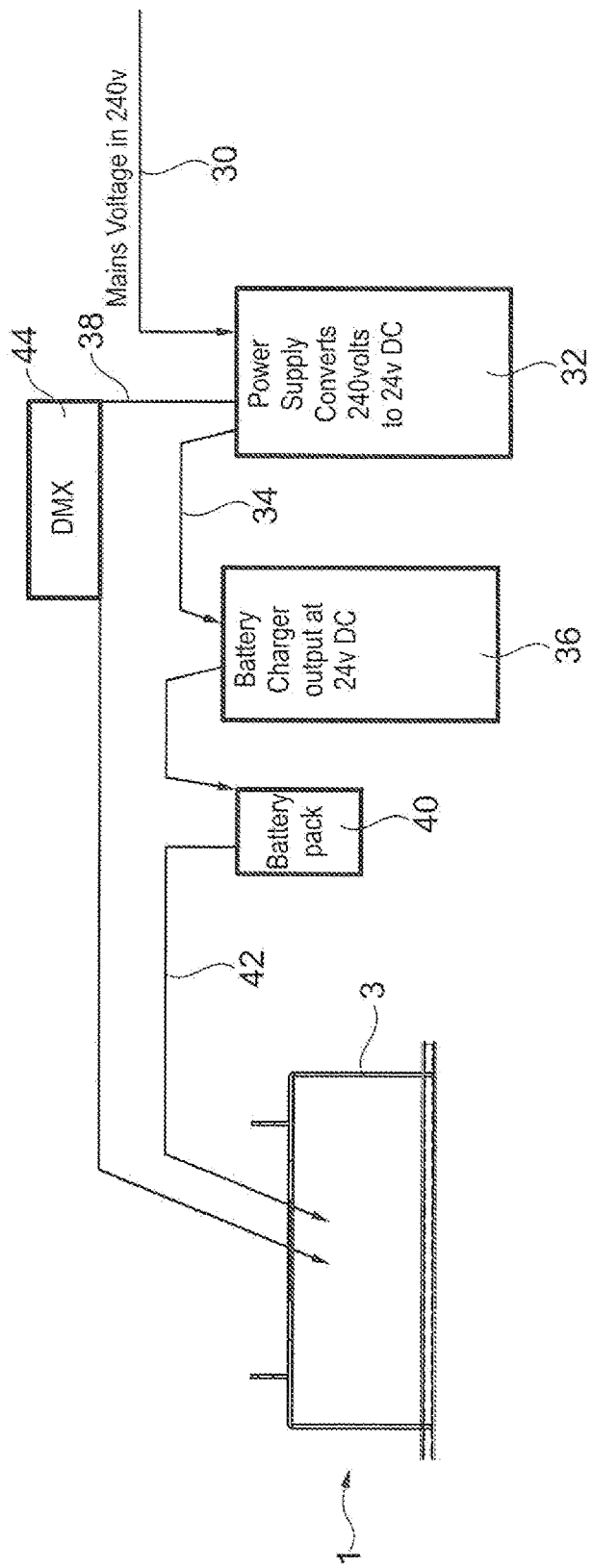
FIG. 4 shows a schematic view of water mist dispensing apparatus according to a further embodiment of the present invention.
Figure 5D:
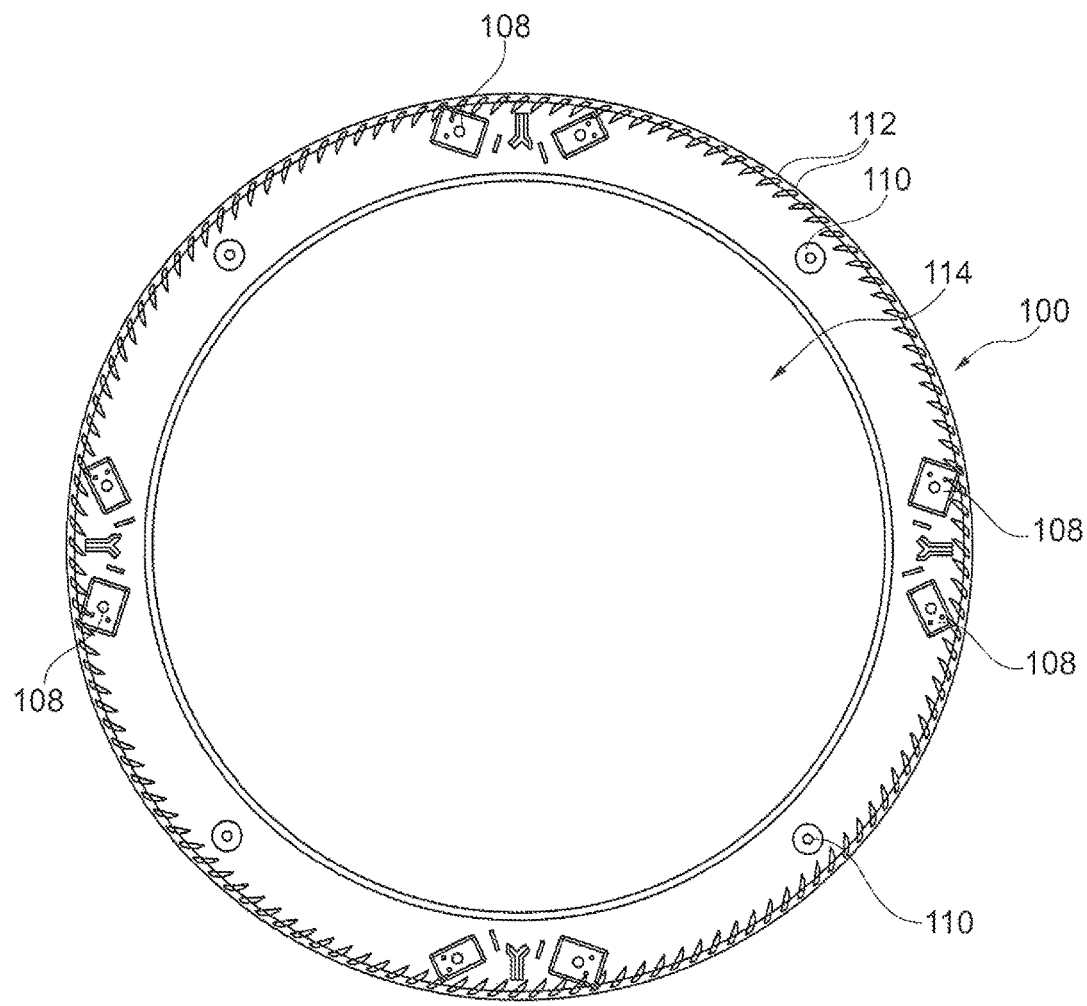

A similar arrangement is shown in FIG. 4 but in this embodiment a DMX wall mounted controller 44 is provided in voltage feed path 38 to allow the colour and/or brightness of the LEDs to be selected and/or varied as required by a user.

Referring to FIGS. 5a-5d, there is illustrated smoke detection means in the form of an annular unit 100 that can be fitted to the exterior of the water mist dispensing apparatus 1 in one embodiment, but which could also form part of a unit independent of the water mist element of the apparatus if required (but including the illumination means and other associated components).

In the illustration the annular unit 100 includes three separate annular components; an upper annular component 102, an intermediate annular component 104, and a lower annular component 106. The intermediate component 104 typically includes the smoke sensors 108 and the electrical circuitry associated with the same. The upper and lower components 102, 106 typically enclose the unit and hold the unit together.

Connection means comprising inter-engaging members in the form of male and female connectors 110 are provided to allow the three components to be joined together.

The intermediate component 104 has a plurality of fin members 112 arranged circumferentially on an exterior edge to allow smoke to be drawn into the unit 100. The fin members 112 in this example are provided around the entire circumference. A plurality of smoke sensors 108 are arranged at spaced apart intervals on the intermediate component 104.

The annular smoke detection unit 100 can be integrally formed or fitted to the mist dispensing apparatus 1. The mist dispensing head 2 is typically located through central aperture 114 of the annular unit 100 and protrudes outwardly therefrom.

A combination of the smoke detection 100 and the mist dispensing apparatus 1 provides a single combined unit offering emergency lighting, main or sole lighting for a locality, smoke detection and fire suppression.

The invention claimed is:

1. Fire mist apparatus, said apparatus including a housing with a cavity, detection means having an annular unit defining a ring-shaped detection chamber having an outside edge with an exterior edge and an inside edge with an interior edge provided on or associated with the apparatus, wherein the detection means includes an upper annular component, an intermediate annular component, and a lower annular component comprising inter-engaging connectors to allow the three components to be joined together, and wherein the intermediate annular component includes smoke sensors operable to detect pre-determined heat or temperature or an amount of smoke within the ring-shaped detection chamber defined between the exterior edge and the interior edge and has a plurality of fin members arranged circumferentially on said exterior edge of the ring-shaped detection chamber; and a fire mist dispensing head mounted in said cavity and having at least one fluid outlet means provided thereon for dispensing a fluid therefrom on activation of said apparatus in use, wherein the dispensing head can be moved between a non-activated position, wherein fluid mist is prevented from being dispensed via the dispensing head, and an activated position, wherein fluid mist can be dispensed from the head and the dispensing head is moved between the non-activated position and the activated position manually and/or automatically when the detection means detect said pre-determined heat or temperature or amount of smoke, and wherein said apparatus further includes illumination means within said cavity capable of emitting light therefrom in use, wherein the illumination means includes one or more light emitting diodes (LEDs).

2. Fire mist apparatus according to claim 1 wherein the illumination means are arranged so as to provide emergency lighting in a locality in which the apparatus is fitted in use and/or to provide a main or sole source of lighting in which the apparatus is fitted in use.

3. Fire mist apparatus according to claim 1 wherein a controller is provided to allow any or any combination of control of a colour of the illumination means, an illumination sequence of the illumination means, a time period or point of the illumination of the illumination means, how many of the illumination means are illuminated at any particular time or the brightness of the illumination means.

4. Fire mist apparatus according to claim 1 wherein said apparatus includes one or more other electrical components, and further comprising a power supply provided in or associated with the apparatus to power the illumination means and/or said one or more other electrical components provided with or associated with the apparatus.

5. Fire mist apparatus according to claim 4 wherein the power supply includes any or any combination of mains power supply, battery power supply, rechargeable battery power supply, water generator power supply and/or a generator power supply.

6. Fire mist apparatus according to claim 4 wherein said power supply includes a first power supply and a second power supply, the illumination are illuminated in a first colour, first combination of colours and/or first sequence of illumination when being supplied with power from the first power supply or in a first power supply condition, and the illumination means are illuminated in at least a second colour, second combination of colours and/or second sequence of illumination when being supplied with power from the second power supply or in a second power supply condition, the first power supply or condition being different to the second power supply or condition.

7. Fire mist apparatus according to claim 4 wherein an electrical transformer is provided on or associated with the apparatus to allow the voltage used to power the illumination means to be stepped up and/or down as required.

8. Fire mist apparatus according to claim 1 wherein the illumination means can be moved between a first illumination condition and at least a second illumination condition, or from an "off" or non-activated condition to an "on" or activated condition on activation of the dispensing head, on activation of a temperature activated bulb, via a switch, via a controller, on activation of motion detection sensor, or on activation of smoke sensor.

9. Fire mist apparatus according to claim 1 wherein a dimming switch or an electrical dimmer is provided on or associated with the apparatus, and/or a switch operating the illumination means to allow the brightness of illumination to be adjusted in use.

10. Fire mist apparatus according to claim 1 wherein the apparatus includes any or any combination of attachment connector for attaching the dispensing head to a surface of the housing either directly or indirectly, engagement coupler for engaging the housing to a suitable surface in use, or a securing fastener for securing the dispensing head to a fluid supply.

11. Fire mist apparatus according to claim 1 wherein the smoke sensors are provided for moving the dispensing head between the non-activated and the activated position and the smoke sensors are provided in or on the same housing as the illumination means and the fire mist dispensing head.

12. A fire mist apparatus according to claim 1, wherein the plurality of fin members are provided around the entire circumference of the housing.

13. A fire mist apparatus according to claim 1, wherein the annular unit surrounds the mist dispensing head and the mist dispensing head protrudes through a central aperture of the housing and outwardly therefrom.

14. A fire mist apparatus according to claim 1, wherein the upper annular component, the intermediate annular component and the lower annular component enclose the ring-shaped detection chamber.

15. A fire mist apparatus according to claim 1, wherein the smoke sensors are housed within the ring-shaped detection chamber.

16. A method of using the fire mist apparatus according to claim 1.

* * * * *